United States Patent
Barneman et al.

(10) Patent No.: US 9,902,593 B2
(45) Date of Patent: Feb. 27, 2018

(54) OVERSPEED GOVERNOR TENSION SHEAVE ASSEMBLY

(71) Applicants: Hakan Barneman, Solna (SE); Gert Van Der Meijden, BV Otterlo (NL); Richard Baker, Bonnybridge (GB)

(72) Inventors: Hakan Barneman, Solna (SE); Gert Van Der Meijden, BV Otterlo (NL); Richard Baker, Bonnybridge (GB)

(73) Assignee: KONE CORPORATION, Helsinki (FI)

( * ) Notice: Subject to any disclaimer, the term of this patent is extended or adjusted under 35 U.S.C. 154(b) by 27 days.

(21) Appl. No.: 14/960,705

(22) Filed: Dec. 7, 2015

(65) Prior Publication Data
US 2016/0083221 A1 Mar. 24, 2016

Related U.S. Application Data

(63) Continuation of application No. PCT/FI2013/050763, filed on Jul. 12, 2013.

(51) Int. Cl.
*B66B 5/04* (2006.01)
*G01C 9/00* (2006.01)
*B66B 5/00* (2006.01)

(52) U.S. Cl.
CPC ............ *B66B 5/044* (2013.01); *B66B 5/0031* (2013.01); *B66B 5/04* (2013.01); *G01C 9/00* (2013.01)

(58) Field of Classification Search
CPC .............. B66B 5/044; G01C 9/00; G01C 9/14
See application file for complete search history.

(56) References Cited

U.S. PATENT DOCUMENTS 5,740,881 A * 4/1998 Lensak ................ G01C 9/12
    182/18
5,956,855 A * 9/1999 Foss .................... E06C 7/003
    33/333
(Continued)

FOREIGN PATENT DOCUMENTS

CN      2349059 Y    11/1999
CN    101078429 A    11/2007
(Continued)

OTHER PUBLICATIONS

Chinese Office Action dated Dec. 1, 2016 issued in corresponding Chinese Application No. 201380078035.0.
(Continued)

*Primary Examiner* — Minh Truong
(74) *Attorney, Agent, or Firm* — Harness, Dickey & Pierce, PLC

(57) ABSTRACT

The invention relates to an overspeed governor tension sheave assembly in an elevator comprising at least an elevator car arranged to run along the guide rails and controlled by a speed governor assembly that is coupled to the elevator car through a governor rope forming a closed loop running over a governor sheave, and under a governor tension sheave being a part of the overspeed governor tension sheave assembly. The overspeed governor tension sheave assembly is equipped with a monitoring device that has indicating means for indicating the need for adjustment the position of the overspeed governor tension sheave assembly.

13 Claims, 4 Drawing Sheets

(56) References Cited

U.S. PATENT DOCUMENTS

Figure 1:
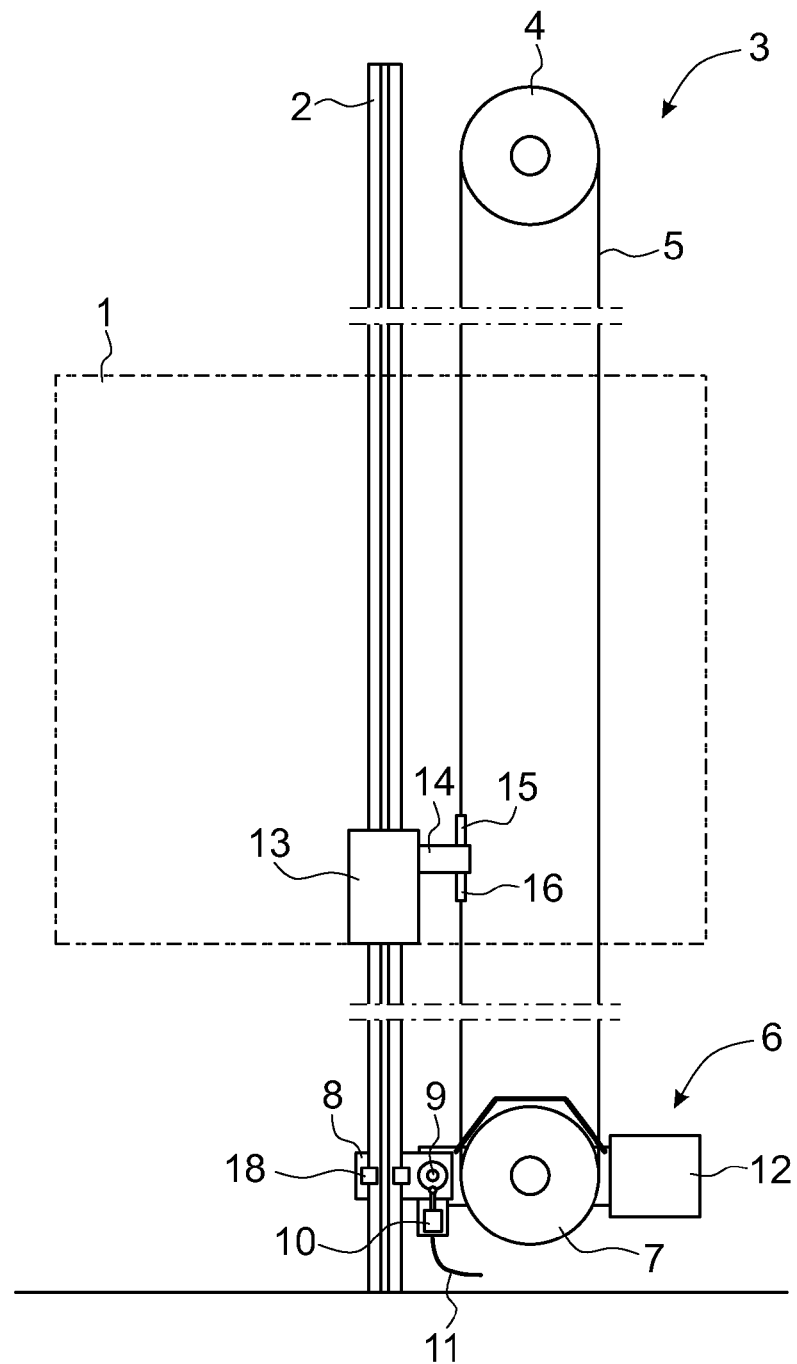

| | | | | |
|---|---|---|---|---|
| 6,619,435 B1* | 9/2003 | Watzke | ............... | B66B 5/04 187/350 |
| 7,594,286 B2* | 9/2009 | Williams | ............ | G01C 9/06 33/348 |
| 7,905,328 B2* | 3/2011 | Windlin | ............... | B66B 5/06 187/286 |
| 7,913,407 B1* | 3/2011 | Finley | ............... | B03B 5/06 33/391 |
| 8,528,703 B2* | 9/2013 | Husmann | ............ | B66B 7/10 187/249 |
| 8,763,763 B2* | 7/2014 | Kawakami | ......... | B66B 5/044 187/247 |
| 2003/0155185 A1* | 8/2003 | Nomura | ............ | B66B 11/009 187/266 |
| 2017/0008732 A1* | 1/2017 | Shiraishi | ............ | B66B 5/12 |

FOREIGN PATENT DOCUMENTS

| | | |
|---|---|---|
| CN | 201914797 U | 8/2011 |
| CN | 202393551 U | 8/2012 |
| CN | 202750512 U | 2/2013 |
| JP | 2008-230792 A | 10/2008 |
| JP | 2012006696 A | 1/2012 |

OTHER PUBLICATIONS

International Search Report PCT/ISA/210 for International Application No. PCT/FI2013/050763 dated Apr. 4, 2014.
Written Opinion of the International Searching Authority PCT/ISA/237 for International Application No. PCT/FI2013/050763 dated Apr. 4, 2014.

* cited by examiner

OVERSPEED GOVERNOR TENSION SHEAVE ASSEMBLY

This application is a continuation of PCT International Application No. PCT/FI2013/050763 which has an International filing date of Jul. 12, 2013, the entire contents of which are incorporated herein by reference.

The present invention relates to an overspeed governor tension sheave assembly as defined in the preamble of claim 1.

For safety reasons traction sheave elevators have a so-called overspeed governor that is arranged to stop the elevator car if the car runs beyond the predetermined speed. A typical overspeed governor assembly comprises a sheave rotated by a governor rope that forms a closed loop and is coupled to the elevator car so that the rope moves with the elevator car. The governor sheave is at the upper end of the governor rope loop and is coupled to an actuation mechanism that reacts to the speed of the elevator car. In order to maintain a sufficient friction to rotate the governor sheave without slippage the overspeed governor assembly includes a tension assembly with a sheave at the lower end of the governor rope loop. The tension assembly is typically equipped also with a weight that keeps the tension of the governor rope essentially constant. In addition the tension assembly comprises a safety switch that monitors proper working of the assembly running the governor rope, in particular by monitoring the position of the overspeed governor tension sheave assembly. The safety switch allow elevator operation in a predetermined adjustment area of the tension assembly's position, but if something abnormal occurs and the position of the tension assembly's position exceeds the predetermined adjustment area, then safety switch cuts power to the elevator motor and brake.

However, the problem is that the position of the overspeed governor tension sheave assembly changes also slowly caused by the elongation of the overspeed governor rope or by other reasons. This creates need for adjustments, because if no adjustments are done, sooner or later the position change of the overspeed governor tension sheave assembly causes a safety switch activation and consequently cuts power to the elevator motor and brake.

In order to avoid unnecessary interruptions in use caused by the safety switch of the overspeed governor tension sheave assembly the correct position of the tension assembly has to be followed frequently and adjusted when needed. In prior art solutions the monitoring is performed so that the elevator car is driven upwards from the bottom floor and stopped there for a service purposes. Then a technician goes down to the bottom of the elevator shaft and checks the position of the tension assembly or checks the suitable play in a mechanism that triggers the safety switch. If the position is between allowed limits and the tension of the governor rope is correct there is no need to make any adjustment, otherwise the adjustment must be done. This kind of following and measuring is slow and laborious and may easily cause errors.

The object of the present invention is to eliminate the drawbacks described above and to achieve a reliable, cost efficient and easy-to-use monitoring solution for an overspeed governor tension sheave assembly. Likewise the object of the present invention is to achieve a monitoring solution for an overspeed governor tension sheave assembly, which makes it possible to perform the monitoring safely and fast in a good working position. The overspeed governor tension sheave assembly according to the invention is characterized by what is presented in the characterization part of claim 1. Other embodiments of the invention are characterized by what is presented in the other claims. Some inventive embodiments are also discussed in the descriptive section of the present application.

The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. Likewise the different details presented in connection with each embodiment can also be applied in other embodiments. In addition it can be stated that at least some of the subclaims can, in at least some situations, be deemed to be inventive in their own right.

The solution according to the invention has the advantage among other things that it saves a lot of time in an installation phase and also in use when monitoring the overspeed governor tension sheave assembly. It also makes it possible to monitor the overspeed governor tension sheave assembly easily and reliably, and thanks to a good working position, without a risk to be hurt resulting from an awkward working conditions and positions. Thus the solution according to the invention improves working safety of maintenance persons.

Figure 2:
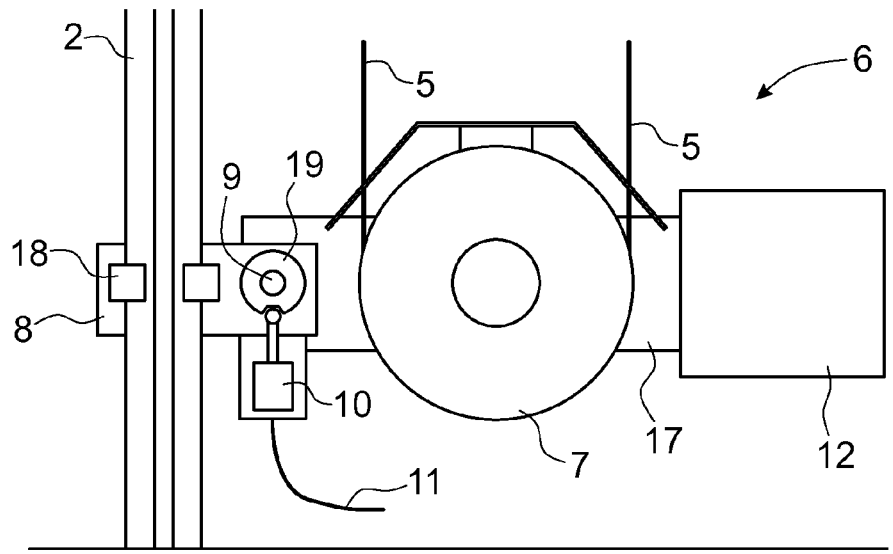
Figure 3:
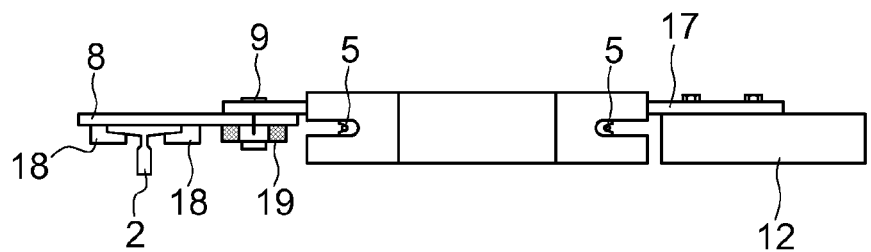
Figure 4:
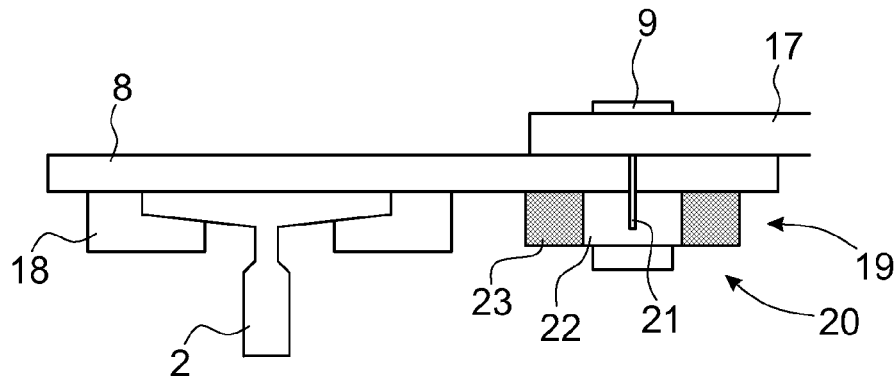
Figure 5:
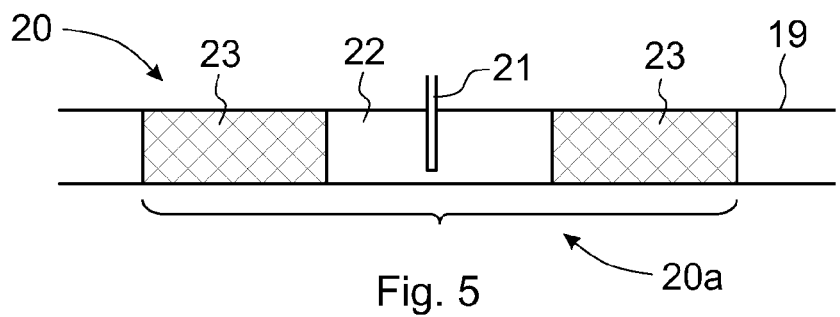
Figure 6:
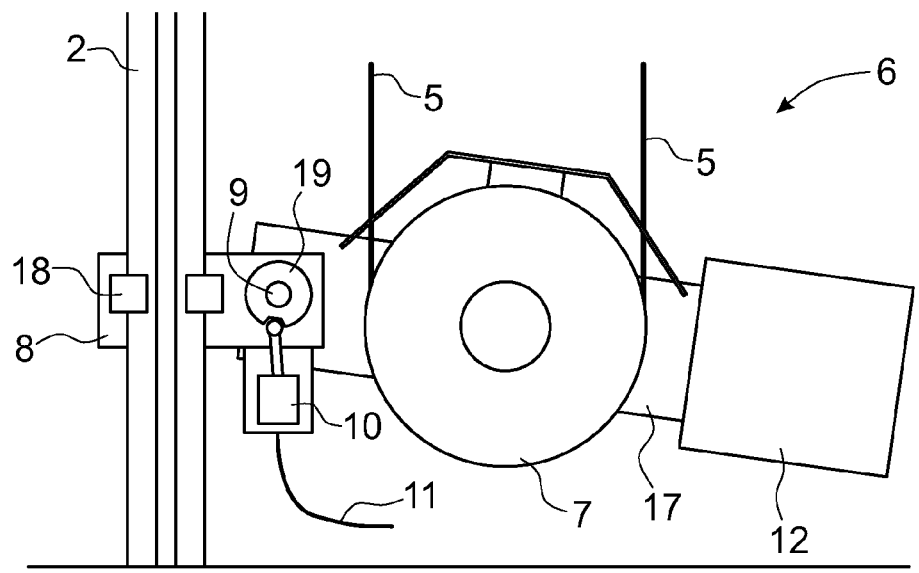
Figure 7:
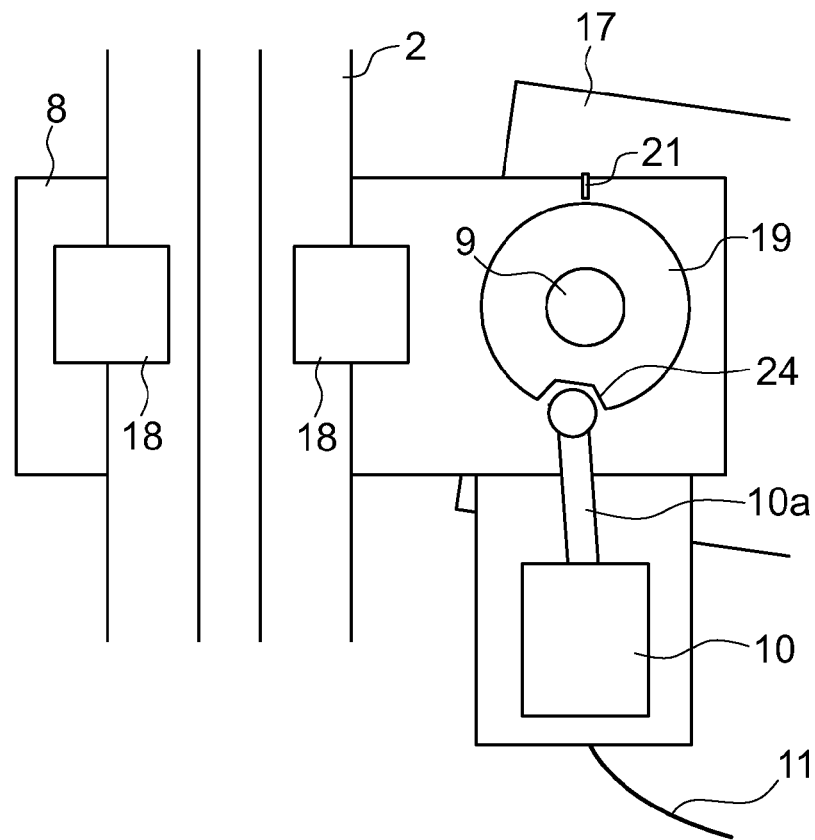
Figure 8:
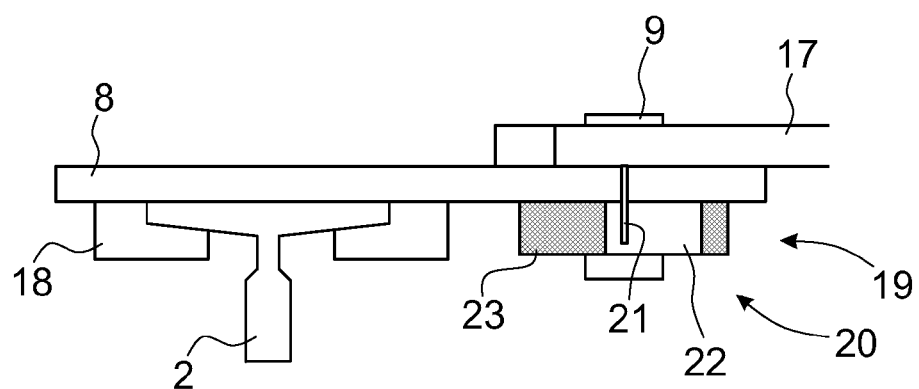

In the invention, an additional monitoring range is defined within that range of allowed positions of the overspeed governor tension assembly. The allowed positions are those, in which the safety switch allows elevator run. The additional monitoring range is used to indicate need of an adjustment of the position of the tension assembly. The indication is preferably visual. The indication can also conveyed by using detector, for example one employing a breaker switch. The detection made using a detector could be monitored from a distant place, such as the control cabinet of the elevator or a service center that remotely receives information from several elevators. In the following, the invention will be described in detail by the aid of an example by referring to the attached simplified and diagrammatic drawings, wherein FIG. 1 presents in a simplified and diagrammatic side view an overspeed governor assembly according to the invention with an elevator car in an elevator shaft, FIG. 2 presents in a simplified and diagrammatic side view an overspeed governor tension sheave assembly according to the invention at the vicinity of the bottom of an elevator shaft, FIG. 3 presents in a simplified and diagrammatic top view the overspeed governor tension sheave assembly according to FIG. 2, FIG. 4 presents in a simplified and diagrammatic enlarged top view the first end of the overspeed governor tension sheave assembly according to FIG. 3, FIG. 5 presents in a simplified and diagrammatic further enlarged top view an indication area of the monitoring device installed at the first end of the overspeed governor tension sheave assembly according to FIG. 3, FIG. 6 presents in a simplified and diagrammatic side view the overspeed governor tension sheave assembly according to FIG. 2 when the governor rope is elongated, FIG. 7 presents in a simplified and diagrammatic enlarged side view the first end of the overspeed governor tension sheave assembly according to FIG. 6, and FIG. 8 presents in a simplified and diagrammatic enlarged top view the first end of the overspeed governor tension sheave assembly according to FIG. 7.

The main focus of the invention is to make it easier, faster, safer and more reliable to monitor the position of the overspeed governor tension sheave assembly of a traction sheave elevator. The basic need is to prevent the safety switch in the overspeed governor tension sheave assembly from making unnecessary power cut-offs. But because the direct monitoring of the safety switch is difficult the monitoring is performed indirectly by monitoring the position of the overspeed governor tension sheave assembly.

FIG. 1 presents in a simplified and diagrammatic side view an elevator car 1 with an overspeed governor assembly 3 according to the invention in an elevator shaft. For the sake of clarity the elevator car 1 is shown only in a dot-and-dash line. The elevator car 1 is running in an elevator shaft up and down along vertical guide rails 2 and the speed of the elevator car 1 is monitored with the overspeed governor assembly 3 that is coupled to the elevator car 1 through a governor rope 5 that forms a closed loop running over an upper sheave called a governor sheave 4, and under a lower sheave called a governor tension sheave 7 that belongs to an overspeed governor tension sheave assembly 6. So the governor tension sheave 7 and the whole overspeed governor tension sheave assembly 6 are supported by the governor rope 5. The overspeed governor tension sheave assembly 6 includes a fishplate 8 at its first end fastened for example to one of the guide rails 2 with the fixing claws 18 or alike. The overspeed governor tension sheave assembly 6 further includes a body 17 hinged at its first end by a pivot spindle 9 to the second end of the fishplate 8. The governor tension sheave 7 is bearing-mounted on the central area of the body 17, and a weight 12 is fastened at the free second end of the body 17 so that influenced by the weight 12 the body 17 can freely tilt around the central axis of the pivot spindle 9. The weight 12 has been selected so that it keeps the tension of the governor rope 5 correct and constant.

The governor rope 5 forms a closed loop with its first end 15 and second end 16 both fastened to a lever mechanism 14 of the safety gear 13 of the elevator. The safety gear 13 is fastened to the elevator car 1 and moves along with the elevator car 1 that rotates the governor rope 5 around the sheaves 4 and 7 at the speed of the elevator car 1. In case of overspeed the actuation mechanism of the overspeed governor assembly 3 reacts to the overspeed of the elevator car 1 and stops the rotation of the governor sheave 4 while the elevator car 1 continues its run. Consequently the motion of the governor rope 5 stops and the lever mechanism 14 actuates the safety gear 13 that stops the motion of the elevator car 1 by engaging to the guide rails 2 and keeping the elevator car 1 gripped with the guide rails 2.

FIGS. 2 and 3 present in a simplified and diagrammatic view the overspeed governor tension sheave assembly 6 according to the invention at the vicinity of the bottom of the elevator shaft. The overspeed governor tension sheave assembly 6 includes a safety switching mechanism comprising at least a circuit-breaker 10 that is connected to the elevator control system through a cable 11, and a trigger mechanism 19 that is arranged to activate the circuit-breaker 10 if the tilting of the body 17 of the overspeed governor tension sheave assembly 6 exceeds the predetermined value. The trigger mechanism 19 is for example a wheel-like component that is installed on the pivot spindle 9 to turn along with the pivot spindle 9 when the body 17 is tilting. When the rotation of the trigger mechanism 19 exceeds the predetermined value the activation of the circuit-breaker 10 takes place.

When the circuit-breaker 10 is activated, power to the elevator motor and brake is cut, thereby causing the brake to apply a braking force on the motor shaft, and consequently the motion of the elevator car 1 is stopped. This is not a desirable situation, and that is why the tilting position of the body 17 must be monitored frequently in order to adjust the position of the body 17 correct before the trigger mechanism 19 would activate the circuit-breaker 10. In order to be able to monitor as easily as possible the tilting position of the body 17 the overspeed governor tension sheave assembly 6 according to the invention comprises an easy to read monitoring device 20 that is better explained later in connection with FIGS. 4, 5 and 8.

FIG. 4 presents in a simplified and diagrammatic enlarged top view the first end of the overspeed governor tension sheave assembly 6. The monitoring device 20 comprises indication means, for example a visible pointer 21 and a visible indication area 20a having an allowable zone 22 and a warning zone 23 on both sides of the allowable zone 22. The color of the allowable zone 22 is for example green and the color of the warning zone 23 is for example red. The pointer 21 is just above the indication area 20a and is placed so that when the overspeed governor tension sheave assembly 6 is in the correct position essentially at horizontal direction and at the correct height, and when the tension of the governor rope 5 is correct, the pointer 21 is in the middle of the allowable zone 22 when seen from above. When the body 17 of the overspeed governor tension sheave assembly 6 tilts, the indication area 20a with the zones 22, 23 turns along with the body 17 but the pointer 21 stays still.

The structure of the monitoring device 20 can vary. For example other colors than green and red can be used and various indication zones can be less or more than those mentioned above. For instance one allowable zone alone could be sufficient, or there could be for example a yellow pre-warning zone between the allowable zone 22 and the warning zones 23. In that case there are five zones in the indication area 20a. Zones 22, 23 could be also replaced by a scale. In that case the scale and its pointer act as indication means indicating the need to adjust the position of the overspeed governor tension sheave assembly 6.

Alternatively the indication means could comprise an electric monitoring device 20 that is coupled to the elevator control system, and works together with proper position sensors installed in the system. In that case either the monitoring device 20 or the position sensors may be coupled to move along with the tilting of the body 17 of the overspeed governor tension sheave assembly 6, and the monitoring device 20 can be arranged to recognize the situation when the tilting position of the body 17 approaches the predetermined limit value, and to give a warning signal to the elevator control system.

Another type of indication means could comprise an electric monitoring device 20 that includes for example an additional monitoring switch whose adjustment area is smaller than the adjustment area of the lever 10a of the circuit-breaker 10, and is inside the latter. Now, when the overspeed governor tension sheave assembly 6 gradually tilts and the position comes to the limit of the additional monitoring switch the additional monitoring switch indicates the need for adjustment the position of the overspeed governor tension sheave assembly 6 before the lever 10a activates the circuit-breaker 10.

The electronic monitoring device 20 can also be remote controlled and contain a camera and/or a machine vision arrangement that can read the zones and scales.

FIG. 5 presents in a simplified and diagrammatic further enlarged top view the indication area 20a of the monitoring device 20 installed on the upper part of the periphery of the wheel of the trigger mechanism 19. In this embodiment the indication area 20a comprises three zones; the allowable zone 22 in the middle and one warning zone 23 in both sides of the allowable zone 22. The pointer 21 is about in the middle of the allowable zone 2 indicating that no need for adjustment exists.

FIGS. 6-8 present in a simplified and diagrammatic view the overspeed governor tension sheave assembly according to the invention in the situation when the governor rope 5 is elongated and the body 17 of the overspeed governor tension sheave assembly 6 has tilted. FIGS. 7 and 8 are enlarged views of the first end of the overspeed governor tension sheave assembly 6 in the same situation.

When the governor rope 5 gradually elongates tilts the body 17 of the overspeed governor tension sheave assembly 6 around the central axis of the pivot spindle 9 and at the same time gradually towards the bottom of the elevator shaft. Consequently the governor tension sheave 7 descents gradually towards the bottom of the elevator shaft and the tension of the governor rope 5 keeps within the allowable limits. When the tilting continues the monitoring device 20 indicates with its pointer 21 and indication zones 22, 23 when the tilting has reached the state where the position of the overspeed governor tension sheave assembly 6 must be adjusted. In that case the length of the governor rope 5 is made shorter or the fishplate 8 is moved higher.

In the situation presented in FIGS. 7 and 8 the inclination of the body 17 of the overspeed governor tension sheave assembly 6 has proceeded so far that the pointer 21 is approaching the border between the allowable zone 22 and the warning zone 23. At the same time a notch 24 coupled to turn the lever 10a of the circuit-breaker 10 on the periphery of the wheel of the trigger mechanism 19 has started to turn the lever 10a. The relation between the width of the zones 22, 23 and the control area of the lever 10a can be set in many ways.

On possible way is that the total width of the indication area 20a, including either only the allowable zone 22 or allowable zone 22 and two warning zones 23 or those three and in addition the two pre-warning zones, must be always smaller than the corresponding control area of the lever 10a. That means that as long as the pointer 21 is inside the indication area 20a the lever 10a does not activate the circuit-breaker 10.

Another way is use the allowable zone 22, two warning zones 23 and two pre-warning zones and to set the relation so that the total width of the allowable zone 22 and the two pre-warning zones is smaller than the corresponding control area of the lever 10a. That means that as long as the pointer 21 is either on the allowable zone 22 or one of the pre-warning zones the lever 10a does not activate the circuit-breaker 10 but if the pointer 21 goes onto one of the warning zones 23 the lever 10a activates the circuit-breaker 10.

The third way is use the allowable zone 22 and two warning zones 23 and to set the relation so that the total width of the allowable zone 22 and the warning zones 23 is smaller than the corresponding the control area of the lever 10a. That means that as long as the pointer 21 is either on the allowable zone 22 or one of the warning zones 23 the lever 10a does not activate the circuit-breaker 10 but if the pointer 21 passes the outer edge of one of the warning zones 23 the lever 10a activates the circuit-breaker 10.

Yet another way is use the allowable zone 22 and two warning zones 23 and to set the relation so that the total width of the allowable zone 22 only is smaller than the corresponding the control area of the lever 10a. That means that as long as the pointer 21 is on the allowable zone 22 the lever 10a does not activate the circuit-breaker 10 but if the pointer 21 goes onto one of the warning zones 23 the lever 10a activates the circuit-breaker 10.

The basic need for adjustment the position of the overspeed governor tension sheave assembly 6 becomes from the need to prevent the lever 10a from activating the circuit-breaker 10 in normal situations of use when the tilting position of the overspeed governor tension sheave assembly 6 has gradually changed.

For monitoring the need for adjustment the overspeed governor tension sheave assembly 6 is equipped with the monitoring device 20 having indicating means 20a-23 for indicating the position of the overspeed governor tension sheave assembly 6. In addition of indicating the position of the overspeed governor tension sheave assembly 6 the indicating means 20a-23 indicates at the same time if the position of the overspeed governor tension sheave assembly 6 is in the allowable zone 22 or approaching one of the pre-warning zone or one of the warning zone 23. So the indication means 20a-23 indicates also that there is no immediate need for adjustment, the need is approaching, or there is an immediate need for adjustment.

With the monitoring device according to the invention the correct time to adjust the position of the body 17 of overspeed governor tension sheave assembly 6 can be easily, quickly, reliably and safely seen from above the overspeed governor tension sheave assembly 6.

It is obvious to the person skilled in the art that the invention is not restricted to the example described above but that it may be varied within the scope of the claims presented below. Thus, for example, the structure of the monitoring device may differ from what is explained above.

It is also obvious to the person skilled in the art that the shape and structure of the safety switching mechanism in the overspeed governor tension sheave assembly can vary. For example the circuit-breaker can be activated also by other type of mechanisms than levers, and the shape and structure of the trigger mechanism can also vary. The safety switching mechanism with the circuit-breaker and trigger mechanism can be for example any kind of a suitable commercially available safety switch.

The invention claimed is:

1. An overspeed governor assembly configured to monitor movement of an elevator car along a guide rail in an elevator shaft, the overspeed governor assembly comprising:
 a first member coupled to the guide rail; and
 an overspeed governor tension sheave assembly coupled to the first member, the overspeed governor tension sheave assembly including,
   a governor tension sheave configured to be supported by a governor rope coupled to the elevator car, such that the governor rope extends in a closed loop running at least under the governor tension sheave,
   a second member coupled to the governor tension sheave and further coupled to the first member through a pivot member, such that the overspeed governor tension sheave assembly is configured to rotate around a central axis of the pivot member in relation to the first member, based on a position of the governor tension sheave in relation to the first member, and
   a monitoring device configured to rotate around the central axis of the pivot member to provide an upwards-directed visually observable indication of whether a magnitude of the overspeed governor tension sheave assembly rotation in relation to the first member at least meets a threshold rotation magnitude, wherein the monitoring device is at least partially configured to move alone with the rotation of the overspeed governor tension sheave assembly.

2. The overspeed governor assembly according to claim 1, wherein,
the monitoring device includes a visible indication area, and
the visible indication area includes at least one allowable zone configured to provide a visually observable indication that the magnitude of the overspeed governor tension sheave assembly rotation is less than the threshold rotation magnitude.

3. The overspeed governor assembly according to claim 2, wherein,
the at least one allowable zone is defined by two separate rotation threshold magnitudes;
the visible indication area includes a plurality of visible zones, the plurality of visible zones including the allowable zone and at least two separate warning zones at least partially defined by separate, respective rotation threshold magnitudes such that the at least one allowable zone is between the at least two separate warning zones; and
each warning zone is configured to provide a visually observable indication that the magnitude of the overspeed governor tension sheave assembly rotation at least meets a separate one of the two rotation threshold magnitudes.

4. The overspeed governor assembly according to claim 3, wherein each zone of the plurality of visible zones is associated with a separate, distinctive color such that the at least two warning zones are associated with a different color than the allowable zone.

5. The overspeed governor assembly according to claim 3, wherein,
the plurality of visible zones includes a pre-warning zone between the allowable zone and at least one warning zone of the at least two warning zones, and
the pre-warning zone is associated with a different color than the allowable zone and the at least two warning zones.

6. The overspeed governor assembly according to claim 2, wherein the indication area includes a scale configured to provide the visually observable indication of the magnitude of the overspeed governor tension sheave assembly rotation.

7. A method of operation of an overspeed governor assembly to monitor movement of an elevator car along a guide rail in an elevator shaft, the method comprising:
an overspeed governor tension sheave assembly of the overspeed governor assembly rotating in relation to a first member of the overspeed governor assembly, wherein,
the first member is coupled to the guide rail,
the overspeed governor tension sheave assembly includes a governor tension sheave configured to be supported by a governor rope coupled to the elevator car such that the governor rope extends in a closed loop running at least under the governor tension sheave,
the overspeed governor tension sheave assembly further includes a second member coupled to the governor tension sheave and further coupled to the first member through a pivot member, and
the overspeed governor tension sheave assembly rotates around a central axis of the pivot member in relation to the first member based on a change in a position of the governor tension sheave in relation to the first member; and
a monitoring device of the overspeed governor assembly rotating around the central axis of the pivot member to provide an upwards-directed visually observable indication of a magnitude of the overspeed governor tension sheave assembly rotation in relation to the first member, based on the rotation of the overspeed governor tension sheave assembly rotation in relation to the first member, wherein the monitoring device at least partially moves along with the rotation of the overspeed governor tension sheave assembly to provide the visually observable indication of the magnitude of the overspeed governor tension sheave assembly rotation.

8. The method of claim 7, further comprising:
the monitoring device providing a visually observable indication that a magnitude of the overspeed governor tension sheave assembly at least meets a threshold rotation magnitude.

9. The method of claim 8, wherein,
the monitoring device includes a visible indication area;
the visible indication area includes at least one allowable zone configured to provide a visually observable indication that a magnitude of the overspeed governor tension sheave assembly rotation is less than the threshold rotation magnitude;
the at least one allowable zone is at least partially defined by a visually observable indication of the threshold rotation magnitude; and
the monitoring device provides the visually observable indication that the magnitude of the overspeed governor tension sheave assembly rotation at least meets the threshold rotation magnitude based on providing a visually observable indication associated with a portion of the visible indication area that is external to the at least one allowable zone.

10. The method of claim 9, wherein,
the at least one allowable zone is defined by two separate rotation threshold magnitudes;
the visible indication area includes a plurality of visible zones;
the plurality of visible zones includes the allowable zone and at least two separate warning zones at least partially defined by separate, respective rotation threshold magnitudes such that the at least one allowable zone is between the at least two separate warning zones; and
each warning zone is configured to provide a visually observable indication that the rotation magnitude exceeds a separate one of the rotation threshold magnitudes.

11. The method of claim 10, wherein each zone of the plurality of visible zones is associated with a separate, distinctive color such that the at least two warning zones are associated with a different color than the allowable zone.

12. The method of claim 10, wherein,
the plurality of visible zones includes a pre-warning zone between the allowable zone and at least one warning zone of the at least two warning zones, and
the pre-warning zone is associated with a different color than the allowable zone and the at least two warning zones.

13. The method of claim 9, wherein the indication area includes a scale configured to provide the visually observable indication of the magnitude of the overspeed governor tension sheave assembly rotation.

\* \* \* \* \*